(Non-printing)

INVENTOR:

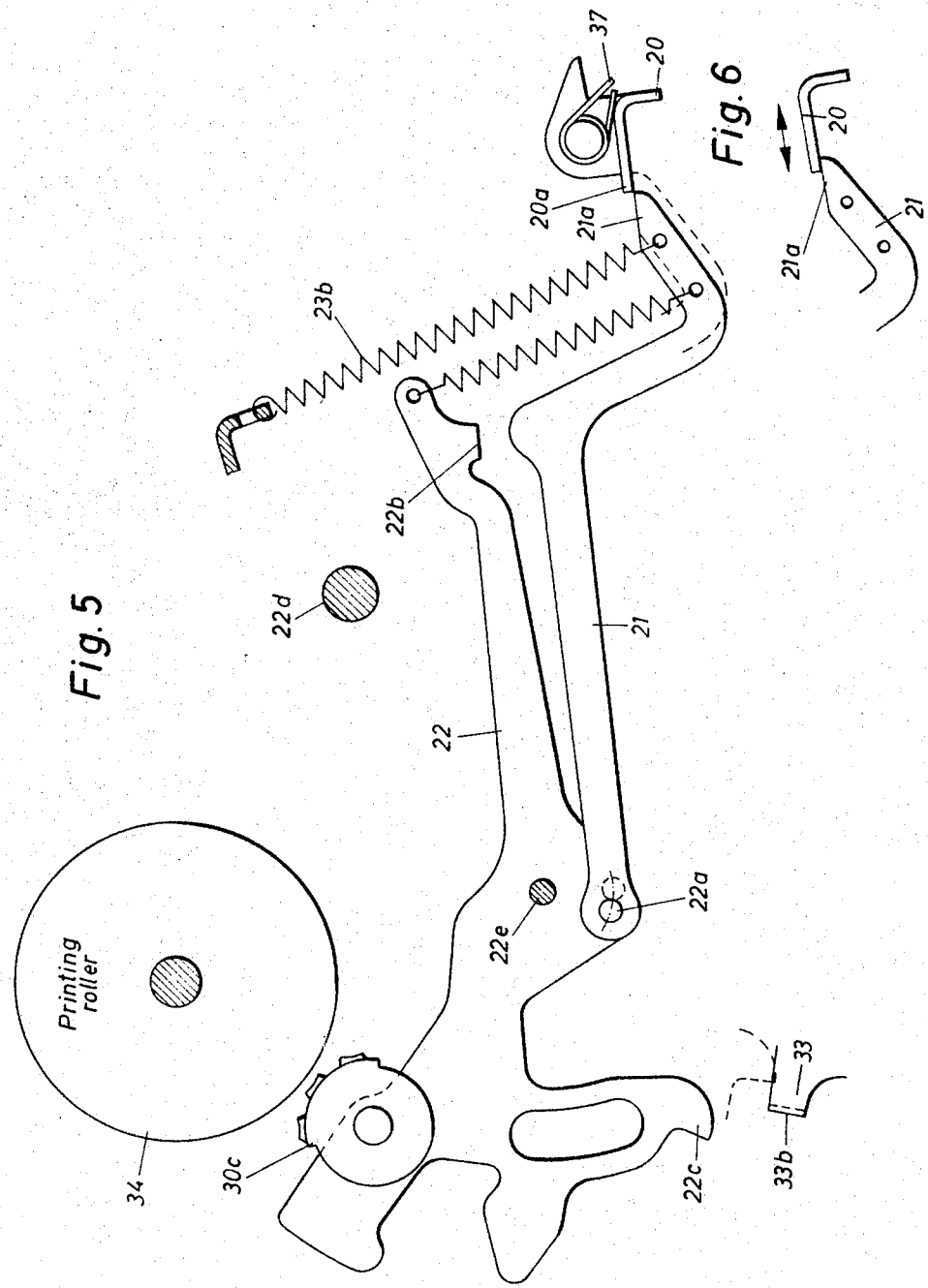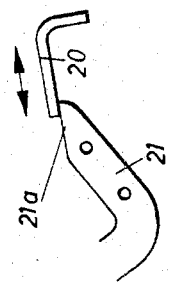

United States Patent Office 3,453,953
Patented July 8, 1969

3,453,953
PIVOTAL TYPE CARRIER FOR LINE PRINTERS FOR ELECTRONIC DATA PROCESSING MACHINE
Helmut Langenberger and Kurt Rohrer, Niederstotzingen, Germany, assignors to Walther-Buromaschinen GmbH., a limited-liability corporation of Germany
Filed June 19, 1967, Ser. No. 647,123
Claims priority, application Germany, June 23, 1966, W 41,843
Int. Cl. B41j 21/00, 25/02
U.S. Cl. 101—93   11 Claims

ABSTRACT OF THE DISCLOSURE

A line printer arrangement having a plurality of type carrier members each carrying a type wheel and a pair of tension springs operatively connected to each type carrier member with one spring acting to move a member into printing position and the other spring acting to return the member to its original non-printing position. The type carrier members are operated through a system of levers by a corresponding number of electromagnets arranged in two rows with successive electromagnets in a row operatively connected to alternate type carrier members.

---

The present invention relates to an impulse-controlled line printer for electronic data processing machines, more particularly, to the arrangement of the type carrier member upon which the type wheel is mounted so that positive forces are employed to move the type carrier member to the printing position and then to return the member to its original non-printing position.

Data processing machines are being used in ever-increasing numbers by a large variety of business firms in order to improve their operating efficiency. Such machines are particularly adapted for large department stores and other businesses in which a large variety of goods or items are continuously received and distributed. With such machines it is possible to ascertain at any time the financial condition of the business and the inventory of the goods or items.

A recent development has been to convert such data processing machines into Real-Time-Systems wherein each individual order or purchase is indicated by the same electronic calculator which summarizes the conditions of the business as a whole. In such a system, a number of terminals or input places are provided in which the various orders or purchases can be recorded. Where an order can be quickly filled by the establishment, the orders are recorded by a line printer which is impulse-controlled by the calculator. This arrangement has the advantage of writing out only those orders or purchases which can be filled immediately from available stock. Whenever a particular item is not in stock, then the order for that item will not be written out. An additional advantage of such a Real-Time-System is that at any time it is possible to read off the summarized condition of the business.

In order to obtain the maximum benefit from such a Real-Time-System, the data processing machine must be provided with a high-speed printer to record as quickly as possible each transaction. While various forms of high-speed printing devices have been provided these printing units have the serious disadvantage of not operating at a high enough speed and occupying too large a space. Such line printers are generally impulse-controlled and are usually provided with a number of type wheels mounted on a type carrier and moved to the printing position by sector gears. Each positioning of the type wheel results from a electronic impulse which energizes an electromagnet which in turn is operatively connected to its respective type wheel by a lever and gear system. A major disadvantage of such an arrangement is that each type wheel and each sector gear must have its own electromagnet and each electromagnet must be mounted in the extremely narrow space provided between two digital positions.

It is therefore the principal object of the present invention to provide a novel and improved line printer for electronic data processing machines.

It is another object of the present invention to provide an impulse-controlled line printer which is faster in operation, less noisy and occupies considerably less space than previously known line printers.

It is a further object of the present invention to provide a line printer for data processing machines which is less susceptible to errors in the operation of the keys and produces the clearest possible recording of values on a paper tape.

According to the present invention, the speed of such a line printer is significantly increased over previous printers by returning the type wheels to their original non-printing positions by a positive force exerted by a spring after the type wheel has struck the paper tape. Secondly, a reduced space is occupied by the electromagnets by positioning the electromagnets, which correspond in number to the type wheels, in two parallel rows. The successive electromagnets in a row correspond to alternate type wheels.

In one aspect of the present invention there may be provided a type carrier member which is mounted for pivotal movement between printing and non-printing positions and carries a type wheel engageable with a printing roll when in the printing position. Each type wheel has gear teeth meshing with intermediate gears carried by its type carrier member with the intermediate gears meshing with a pivotally mounted sector gear. Coaxial with the sector gear is a sector member having a plurality of perforations adjacent its periphery. Each type carrier member is retained in its non-printing position by a locking lever. A tensioning lever is pivotally mounted on each type carrier member and a first tension spring has one end fixed and its other end connected to the tensioning lever. A second tension spring is provided and is connected between the tensioning lever and the type carrier member. The first spring functions to urge the type carrier member to its original non-printing position and the second spring acts to move the type carrier member into the printing position. When the sector gear is moving its respective type wheel to correspond with a digital value registered in the data processing machine, the tensioning lever is being moved to its tensioned position to tension both springs. After the type wheel has been positioned, the lever system unlocks the retaining means and the type carrier is moved to the printing position under the action of the second tension spring. As soon as the type wheel impacts the printing roll, the first spring acts to return the type carrier member to its non-printing position.

A plurality of electromagnets corresponding in plurality to the type carrier members are arranged in two rows with the successive electromagnets in a row corresponding to alternate type carrier members. The actuating levers operated by each electromagnet are mounted on a common pivot axis. By arranging the electromagnets in two parallel rows, the previous difficulty of confining each electromagnet to the narrow space between adjacent rows of digital positions is eliminated. In the present line printer each electromagnet can occupy twice the space between rows of digital positions so that the digital positions can be positioned very close to one another in order to save space. Each actuating lever operated by an electromagnet is provided with a positive mechanical return so that the possibility of a stuck lever is eliminated and it is virtually impossible to obtain an incorrect printing. The actuating levers may be coated with plastic to avoid any tendency to stick to each other.

Other objects and advantages of the present invention will be apparent upon reference to the accompanying description when taken in conjunction with the following drawings, wherein;

FIGURE 1 is a side elevational view partially in section of the driving and controlling mechanism of the present invention;

FIUGRE 2 is a view similar to that of FIGURE 1 with a portion of the driving mechanism omitted to clarify the relationship of the several components;

FIGURE 5 is a view similar to that of FIGURE 4 but showing the position of the type carrier member just before the type wheel strikes the paper on the printing roll;

FIGURE 6 shows a portion of FIGURE 5 showing the manner in which the impact force of the type carrier member can be adjusted.

Returning now to the drawings wherein like reference symbols indicate the same parts throughout the various views a specific embodiment of the present invention will be described in detail.

Figure 1:
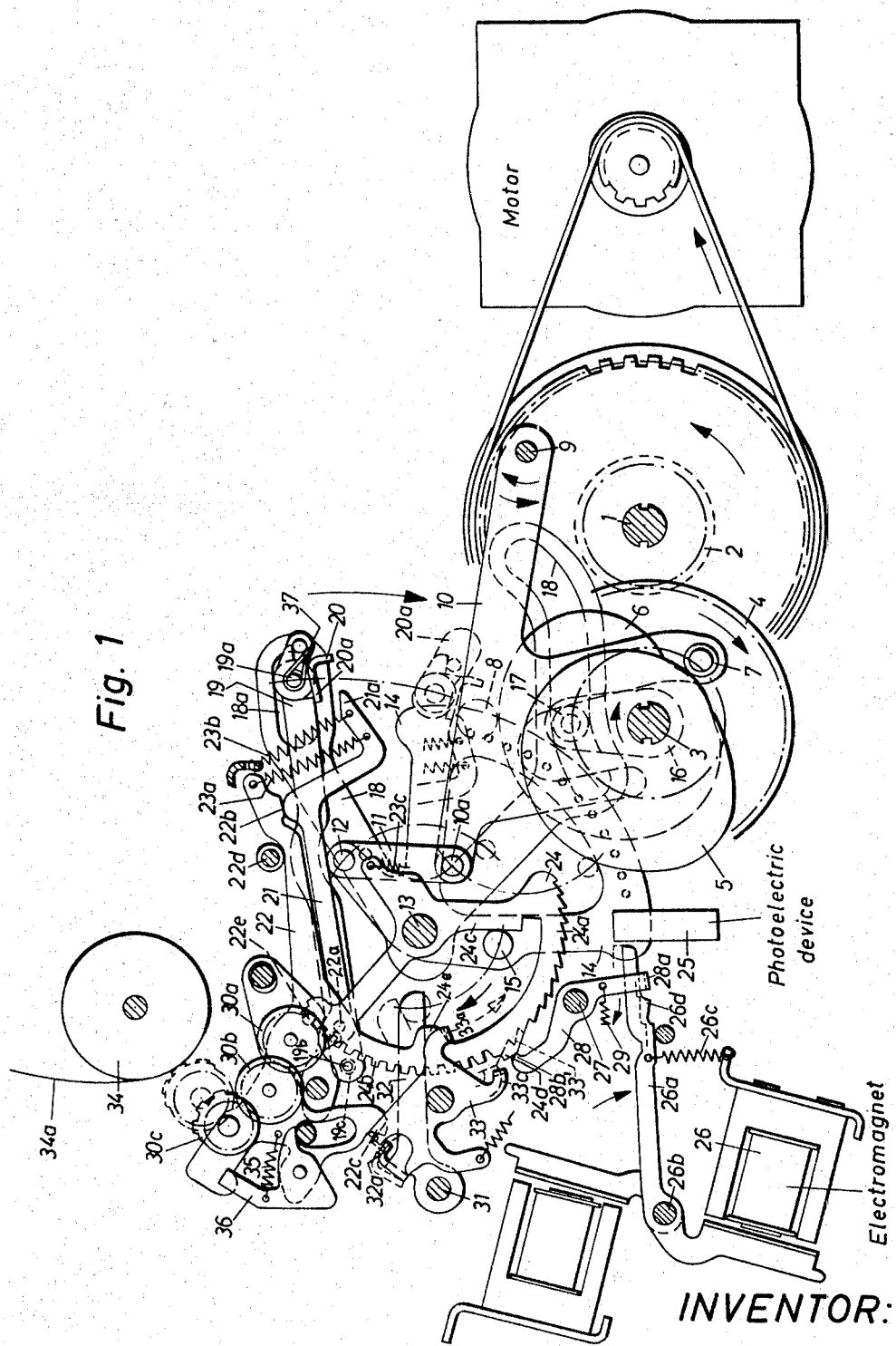
Figure 2:
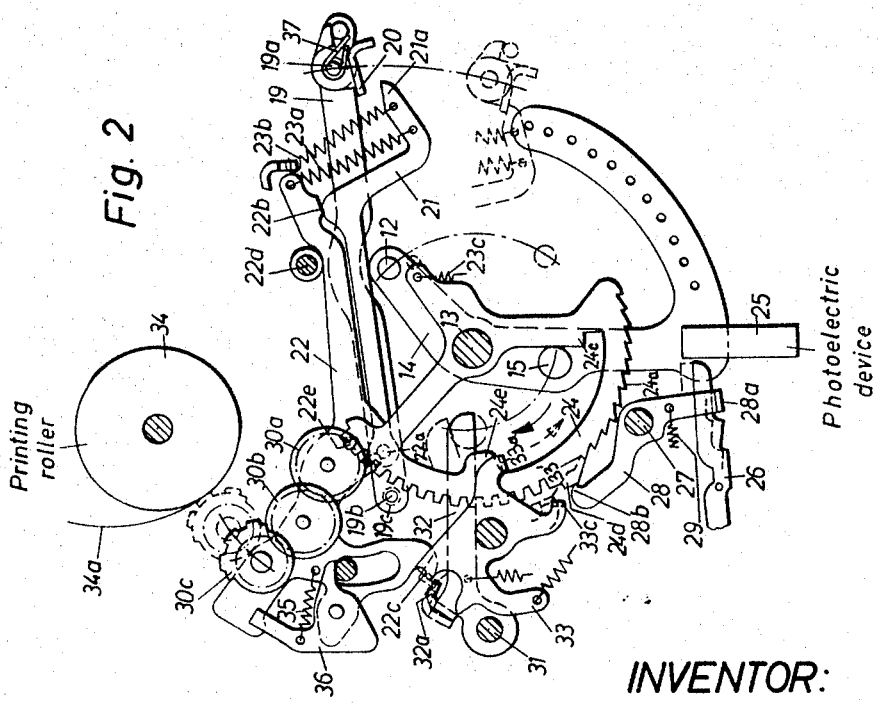

As may be seen in FIGURE 1, the data processing machine of the present invention comprises a motor driven shaft 1 having spur gear 2 meshing with a driven gear 4 mounted on a main drive shaft 3. The gear 4 is the actuating member of a clutch (not shown in the drawings). The clutch is magnetically engaged in a known manner to rotate main drive shaft 3 in a counter clockwise direction as viewed in FIGURE 1. The main drive shaft 3 has mounted thereon cam disks 5 and 6 which are respectively engaged by cam rollers 7 and 8 mounted on a lever 10 which in turn is pivotally mounted on a pin 9. The lever 10 has a pin 10a thereon to which is connected one end of a link 11 with the other end of the link being connected to a pin 12 on a perforated sector member 14 which is pivotable about a shaft 13. The sector member 14 is provided with a plurality of perforations adjacent its peripheral edge as may be seen in FIGURE 2. A collecting shaft 15 is mounted on the sector member 14 and moves clockwise in the direction of the arrows in FIGURES 1 and 2 as a result of the pivotal movement of lever 10 about the axis 9.

The main drive shaft 3 also carries a crank arm 16 which has a roller 19 thereon received within a slot of a frame member 18 which is also pivotally mounted on the shaft 13. The upper arm of the frame member 18 is provided with a slot 18a which receives one end of a disengaging bridge 19 carrying pin 19a upon which is pivotally mounted a disengaging tab 20 with a tab end 20a. The other end of the disengaging bridge 19 carries a pivot axis 19b mounted upon an eccentric bolt 19c so that the axial center of the bolt is adjustable.

Figure 4:
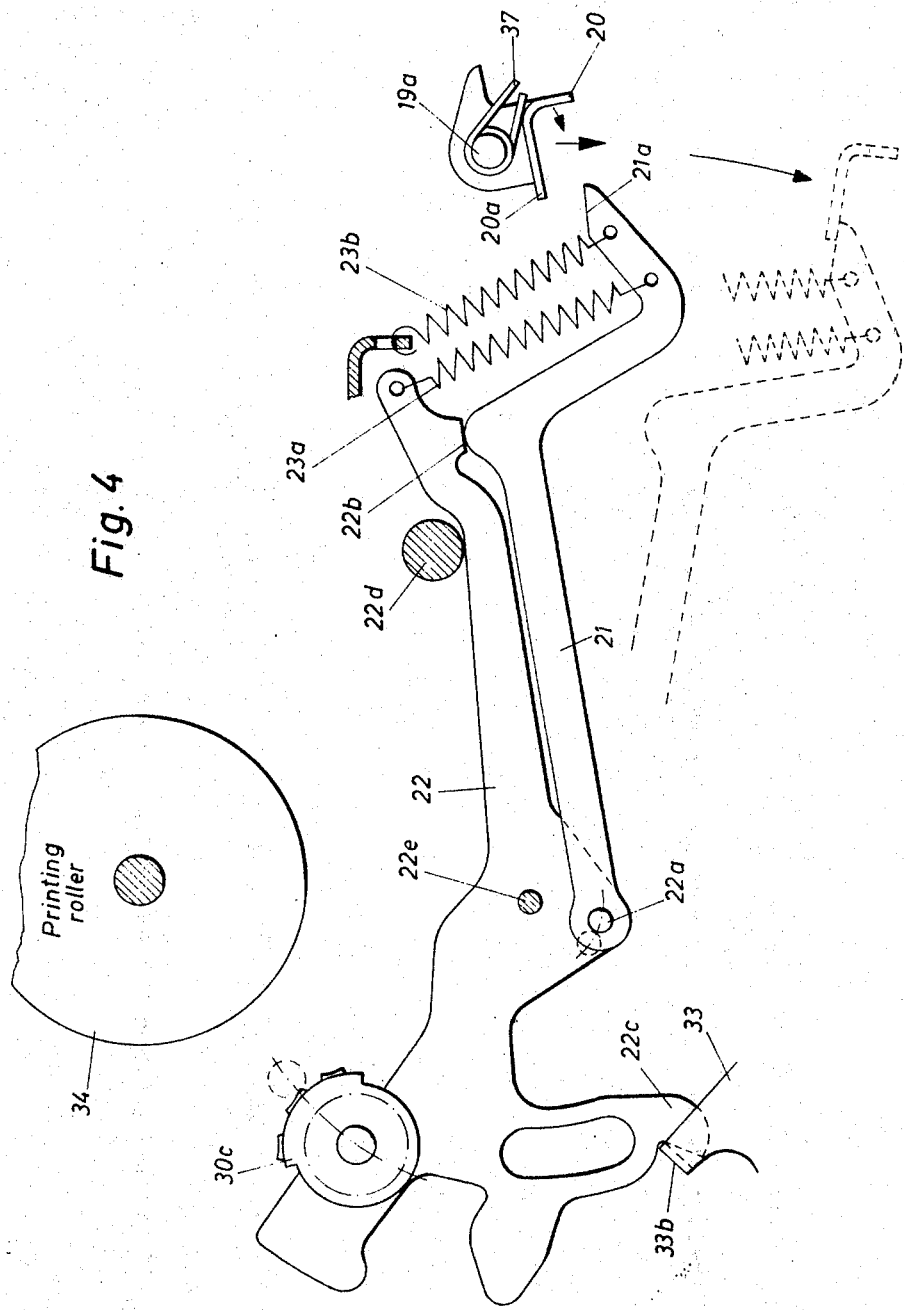
FIGURE 4 is a side elevational view of the type carrier member illustrated in FIGURE 1 but in greatly enlarged scale with the member being in the non-printing position and the dotted lines showing the tensioned position of the tensioning lever.

As may best be seen in FIGURES 4 and 5, a type wheel carrier member 22 is pivotally mounted at 22e and on one end thereof carries a type wheel 30c having gear teeth thereon. The gear teeth are engageable with intermediate gears 30a and 30b similarly mounted on the type carrier member 22. At the other end of the type carrier member there is an abutment 22b engageable with a tensioning lever 21 which is pivotally mounted on the type carrier member at 22a. A tension spring 23a connects one end of the type carrier member 22 with tensioning lever 21. A second tension spring 23b has one end mounted on a fixed abutment of the machine and the other end connected to the tensioning lever 21. A shoulder 21a on tension lever 21 is engageable by the tab 20a so that the tension lever may be moved to the tensioned position as shown by the dotted lines in FIGURE 4.

A sector gear 24 is pivotally mounted on the shaft 13 and has ratchet teeth 24a along one peripheral portion and gear teeth 24b along another peripheral portion. The gear teeth 24b are engageable with intermediate gear 30a and remain engageable with this intermediate gear throughout the pivoting movement of the type carrier member. A tension spring 23c connects sector gear 24 with the perforated sector member 14 for movement therewith.

Figure 7:
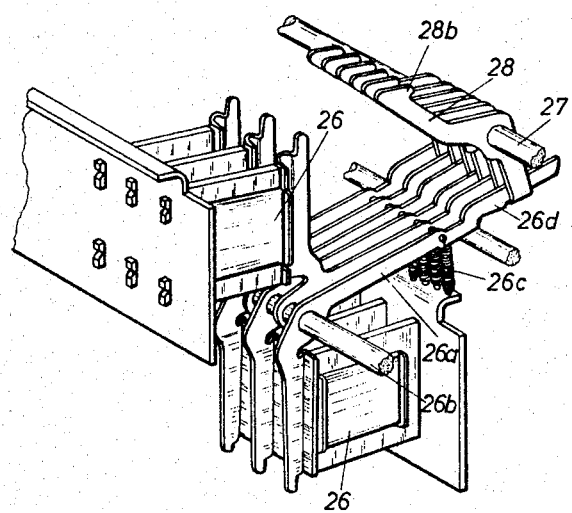
FIGURE 7 is a perspective view showing the arrangement of the electromagnets for controlling the respective type carrier members.

The perforations in sector member 14 are successively aligned with a photo-electric receiver 25 so that energization of the photo-electric receiver will in turn energize an electromagnet 26. The electromagnets 26 are arranged in two parallel rows as may be best seen in FIGURE 7 and one electromagnet is provided for each type carrier member. The energization of an electromagnet 26 will attract its respective actuating lever 26a which is pivoted on a shaft 26b. It is pointed out that the actuating levers operated by the electromagnets in the lower-most row have downwardly depending arms whereas the actuating levers operated by the electromagnets in the upper row have upwardly extending arms. However, as shown in FIGURE 7, all of these actuating members are pivotally mounted on the common shaft 26b. The actuating levers are retained in their normal inoperative positions against a stop bar by springs 26c.

Each actuating lever has a contact nose 26d against which rests a tab 28a of a pawl 28 pivotally mounted at 27. A tension spring 29 urges the pawl 28 in a clockwise direction as viewed in the drawings.

A locking lever 32 is pivotally mounted at 31 and has a bent lug 32a thereon which locks a retaining lever 33 in position so that a tab 33b engages a lug 22c to retain the type carrier member 22 in its normal non-printing position as illustrated in FIGURE 4.

*Operation*

The operation of the calculating machine according to the present invention is initiated by registering a digital value in the machine usually by manually actuating a key in a keyboard. A clutch is then engaged to rotate the main drive shaft 3 clockwise. The lever 10 is then pivoted counter clockwise about its axis 9 under the action of the cam disks 5 and 6 engaging its rollers 7 and 8. Under the action of link 11, the perforated sector member 14 is pivoted clockwise to move the collecting shaft 15 along the path as indicated in FIG. 1. At the same time, the crank arm 16 by means of the roller 17 pivots frame member 18 clockwise about shaft 13. This causes slot 18a to move downwardly to the position indicated by the dash lines in FIGURE 1. The tab 20a engages shoulder 21a of tension lever 21 and moves the tension lever 21 to its tensioned position so as to tension springs 23a and 23b.

As sector member 14 pivots clockwise, the sector gear 24 also pivots clockwise under the action of spring 23c. The perforations are successively moved past the photoelectric receiver 25 until a perforations which coincides with the electronic signal of the digital value registered in the machine energizes the receiver.

An electromagnet 26 corresponding to the digital value registered in the machine, will be energized to attract its respective actuating lever whereby the lever 26a is pivoted clockwise against the force of spring 26c. Contact nose 26d will be lifted from the path of tab 28a on pawl 28 and the pawl 28 will rotate clockwise under the action of spring 29 until the pawl hook 28b engages a corresponding one of the ratchet teeth 24a. The sector gear 24 will then be held fixed against the force exerted by spring 23c.

During the pivotal movement of sector gear 24, the gear teeth 24b will act through intermediate gears 30a and 30b to rotate type wheel 30c to the position corresponding to the digital value. It is pointed out that the pivot point 22e of the type carrying member 22 is so positioned that the gear teeth 24b on sector gear 24 will always be in mesh with intermediate gear 30a even during the subsequent movement of the type carrier member 22 as will be presently described.

Just before the collector shaft 15 reaches the uppermost limit of its travel as indicated in the dash lines in FIGURE 1, the shaft 15 will engage the locking lever 32 and pivot this lever upwardly to the dashed position. The lug 32a is then disengaged from retaining lever 33 which then pivots clockwise under the action of its spring to release lug 22c of the type carrier 22. The tensioned spring 23a then pivots the type carrier member 22 clockwise about its pivot point 22e to move the type wheel 30c into the printing position against the paper tape 34a carried by the printing roll 34.

Just before they the type wheel 30c strikes roll 34, the type carrier 22 has moved pivot point 22a to the new position as shown in FIGURE 5. As a result, tension lever 21 is moved toward the left out from under edge 20a to release the tension lever 21 from its tensioned position. The kinetic energy of the moving type carrier member 22 will cause the type wheel 30c to strike against roll 34, but at the same time, tension spring 23b acts to draw tension lever 21 back to its original position. The type carrier member 22 is thus carried along by means of the tension lever 21 engaging the abutment 22b until the carrier member returns to its original position against stop 22d.

During the upward or return movement of the tab 20, the tab slides over shoulder 21a against force of a torsion spring 37 mounted on the pin 19a.

The impact energy of type wheel 30c against the printing roll 34 can be adjusted in either direction, i.e., increased or decreased, by varying the position of the tab 20 as indicated by the double arrow in FIGURE 6. The tab 20 is positioned on the end of the disengaging bridge 19 which has an eccentric mount at 19c. Thus, adjusting the position of the bridge 19 to the left or to the right as viewed in FIGURE 1 will vary the position of the tab 20. The point at which the disengagement of the tension lever 21 from tab edge 20a occurs during the upward pivotal movement of the type carrier member is determined by the position of tab 20. As described previously, the tension lever 21 will be moved to the left as may be seen in FIGURES 4 and 5 during the pivotal movement of type carrier member 22 to the printing position. The closer type wheel 30c is to the printing roll 34 at the time when tension lever 21 is released from tab 20, the more forceful will be the impact of type wheel 30c on the printing roll.

During the printing movement of type carrier member 22, a fixing pawl 36 which is pivotally mounted on the type carrier member and kept in position by a tension spring 35 engages the periphery of the gear tooth portion of type wheel 30c. As a result, type wheel 30c is maintained in approximately the correct position so that the printed lines will be uniformly spaced.

The upward or return movement of type carrier member 22 is limited by the stop 22d against which the type carrier member rests when in its original or non-printing position.

After the collecting shaft 15 on sector member 14 reaches its upper limit as indicated by the dash lines in FIGURE 1, the movement of the collecting shaft will be reversed as the main drive shaft 3 proceeds into the latter stages of a revolution. The collecting shaft 15 will engage abutment 24c of sector gear 24 to return the sector gear to its original position. The movement of sector gear 24 to its original position will also return type wheel 30c to its original position through intermediate gears 30a and 30b. Cam member 24e on sector gear 24 will engage tab 33a of retaining lever 33 and pivot this lever to its original position to lock the type carrier member in the non-printing position. At the same time, pawl 28 will be pivoted to its original position by the inclined surface of cam 24d on sector gear 24.

After the entire printing operation has been completed and the main drive shaft 3 has rotated through a complete revolution, the shaft will be stopped by the clutch.

*Non-printing position*

According to the present invention, the non-printing position of the type carrier member can occur either at the beginning or at the end of the pivotal movement of the type carrier member. This makes it possible to leave open spaces in selected places on the paper tape so that various groups of digits can be distinctly separated from each other. As a result, the recorded values on the paper tape will be clearly apparent even upon quick inspection.

In the non-printing position as indicated at 33' shown in dotted lines in FIGURE 1, the retaining nose 28d of pawl 28 is moved into the first tooth of ratchet teeth 24a on sector gear 24. This positions shoulder 24d on sector gear 24 directly opposite the bent tab 33c at the bottom of the retaining lever 33. Thus, when the locking lever 32 is pivoted upwardly by collecting shaft 15 to release retaining lever 33, the lever 33 will not be able to pivot under the action of the spring since pivotal movement of the lever 33 is blocked by shoulder 24d. As a result, the lug 22c on type carrier member 22 will remain locked and no printing will occur.

However, if sector gear 24 is in a printing position with its shoulder 24d outside of the pivotal path of lever 33, then lever 33 will permit the release of the type carrier member 22 which, under the action of spring 23b will print the digit which has been keyed into position on the type wheel.

Figure 3:
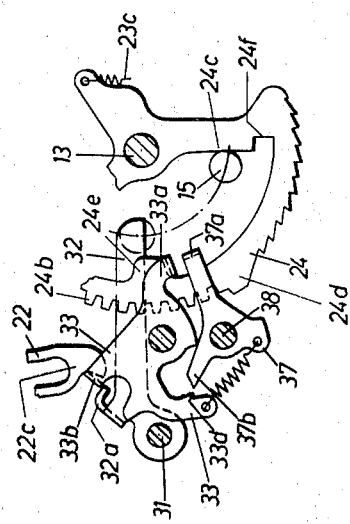
FIGURE 3 is a side elevational view showing only that portion of the mechanism of FIGURE 1 for controlling the "non-printing" position.

In FIGURE 3, there is illustrated a preferred construction of the control elements for the non-printing position. There is provided a locking pawl 37 pivoted at 38 having a bent lug 37a and a nose 37b. In this construction, the non-printing results from the end position of sector gear 24. The sector gear is provided with a shoulder 24f which moving in the clockwise direction will engage bent tab 37a to pivot locking pawl 37 so that the nose 37b engages a shoulder 33d on retaining lever 33. This prevents pivotal movement of the lever 33 and prevents release of the type carrier member 22.

It is pointed out that in the description and drawings of the present invention only a single type wheel and its type carrier member has been shown for purposes of clarity. However, in the usual construction of such a machine, there will be a plurality of closely spaced type carrier members with the operations of each of these type carrier members being performed as described above.

*Electromagnets*

In the present machine there is provided a number of electromagnets corresponding to the number of type carrier members. As may be seen in FIGURE 7, these electromagnets are arranged in two parallel rows with the successive electromagnets in a row being operatively connected to alternate type carrier members. By positioning the electromagnets in two rows, additional space will be provided for each electromagnet but the type carrier members and the type wheels can be positioned even closer together.

*Conclusion*

Thus it can be seen that the present invention provides a high-speed line printer wherein the movement of the type wheel to the printing and non-printing positions is positively actuated by tensioned springs. The impact of the type wheel against the printing roll can be readily controlled by adjusting the position at which the tensioning lever is released. In addition, the arrangement of the electromagnets in two rows provides for a closer spacing of the type wheel so that the present construction occupies less space than conventional machines. The control and driving mechanisms for operating the line printer are simple in construction yet effective so as to provide trouble-free operation over long periods of time.

It will be understood that this invention is subject to modifications in order to adapt it to different usages and conditions and, accordingly, it is desired to comprehend such modifications within this invention as may fall within the scope of the appended claims.

What is claimed is:

1. In a line printer arrangement for electronic data processing machines, the combination of a type carrier member mounted for pivotal movement between printing and non-printing positions and having a type wheel thereon for engagement with a printing roll in the printing position, means for positioning said type wheel to correspond to a digital valve registered in the data processing machine, means lockingly engageable with said type carrier member for retaining said member in the non-printing position, a first spring having one end connected to a fixed support and a second spring having one end connected to said type carrier member, means operatively connected to said type carrier member and having the other ends of said first and second springs connected thereto for tensioning said first and second springs during the positioning of said type wheel and said carrier member is retained in the non-printing position, means for unlocking said retaining means after said type wheel has been positioned so that said type carrier member is moved to the printing position under the action of said tensioned second spring, said tensioned first spring acting through said tensioning means to return the member to its non-printing position after being moved to its printing position and to return the tensioning means to its untensioned position.

2. In a line printer arrangement as claimed in claim 1 wherein said tensioning means comprises a tensioning lever pivotally mounted on said type carrier member, said first spring having one end connected to a fixed support and the other end connected to said tensioning lever, said second spring being connected between said tensioning lever and said type carrier member.

3. In a line printer arrangement as claimed in claim 2 with said type carrier member having an abutment thereon engageable by said tensioning lever, said locking means comprising a lever having a tab engageable with said type carrier member, means engageable with said tensioning lever for holding said tensioning lever in the position in which said first and second springs are tensioned, and means for actuating said holding means just before said type wheel engages the printing roll so that said tensioning lever is released and under the action of said first spring impact against said type carrier member abutment after the printing whereby said type carrier member is returned to its non-printing position.

4. In a line printer arrangement as claimed in claim 1 with said type wheel having gear teeth thereon, gear means on said type carrier member and meshing with said type wheel gear teeth, said type wheel positioning means comprising a sector gear meshing with said gear means, said type carrier member having its pivot mount so located between said type wheel and said second spring connection that said gear means remains in mesh with said sector gear.

5. In a line printer arrangement as claimed in claim 4 wherein said gear means comprises a pair of meshing gears with one gear also meshing with said type wheel and the other gear also in mesh with said sector gear.

6. In a line printer arrangement as claimed in claim 1 with said type wheel positioning means comprising a sector gear having gear teeth along a peripheral portion thereof and ratchet teeth on another peripheral portion thereof, there being a shoulder on said sector gear between said gear teeth and said ratchet teeth, and a pivotally mounted pawl engageable with the first ratchet tooth when said sector gear is in the non-printing position to position said shoulder to block said retaining means whereby said type carrier member is retained in its non-printing position.

7. In a line printer arrangement as claimed in claim 2 and further comprising means operative concurrent with said type wheel positioning means for moving said tensioning lever to the position in which said first and second springs are tensioned.

8. In a line printer arrangement as claimed in claim 1 with said type wheel positioning means comprising a pivotally mounted sector member having a plurality of perforations adjacent its periphery, a photo-electric receiver operatively positioned with respect to said perforations and actuated thereby, a main drive shaft having a cam disk mounted thereon, a pivotally mounted lever having cam roller means responsive to said cam disk, and link means operatively connecting said lever and said sector member so that the successive perforations are aligned with said photo-electric receiver.

9. In a line printer arrangement as claimed in claim 2 and further comprising a main drive shaft having a crank arm mounted thereon, a pivotally mounted member having two arms with one arm being operatively connected to said crank arm so that rotation of said crank arm will pivot said two-armed member, and means on the other arm of said member engageable with said tensioning lever to move the same to the tensioning position.

10. In a line printer arrangement as claimed in claim 1 and further comprising a plurality of said type carrier members closely spaced adjacent each other, a corresponding plurality of electromagnets arranged in two rows with the successive electromagnets in a row corresponding to alternate type carrier members, said electromagnets being responsive to the digital value registered in the data processing machine for controlling said type wheel positioning means, a corresponding plurality of actuating levers pivotally mounted on an axis between said two rows of electromagnets, alternate ones of said actuating levers having arms in operative relationship to alternate electromagnets in said two rows, and a corresponding plurality of pivotally mounted pawls engageable with said type wheel positioning means and retained in the disengaged position by said actuating levers.

11. In a line printer arrangement as claimed in claim 10 and further comprising means operatively connected to said actuating levers for returning said actuating levers to their original positions after completion of a printing operation.

References Cited

UNITED STATES PATENTS

| | | | |
|---|---|---|---|
| 1,971,859 | 8/1934 | Knutsen | 101—93 |
| 2,281,851 | 5/1942 | Mehan | 101—96 |
| 2,346,265 | 4/1944 | Mehan | 101—96 |
| 2,492,263 | 12/1949 | Boyden | 101—96 |
| 2,799,221 | 7/1957 | Olivetti | 101—93 |
| 2,832,283 | 4/1958 | Westinger et al. | 101—93 |
| 2,879,712 | 3/1959 | Mark | 101—95 |
| 2,973,708 | 3/1961 | Becker | 101—95 |

WILLIAM B. PENN, *Primary Examiner.*

PO-1050
(5/69)

UNITED STATES PATENT OFFICE
CERTIFICATE OF CORRECTION

Patent No. 3,453,953          Dated July 8, 1969

Inventor(s) Helmut Langenberger and Kurt Röhrer

It is certified that error appears in the above-identified patent and that said Letters Patent are hereby corrected as shown below:

On each sheet of the drawings the name of the patentee should appear as:
         H. LANGENBERGER et al.

SIGNED AND SEALED
MAY 26 1970

(SEAL)
Attest:

Edward M. Fletcher, Jr.
Attesting Officer

WILLIAM E. SCHUYLER, JR.
Commissioner of Patents